No. 852,614. PATENTED MAY 7, 1907.
C. J. PERSON.
BELT LACER'S TOOL.
APPLICATION FILED MAR. 9, 1907.
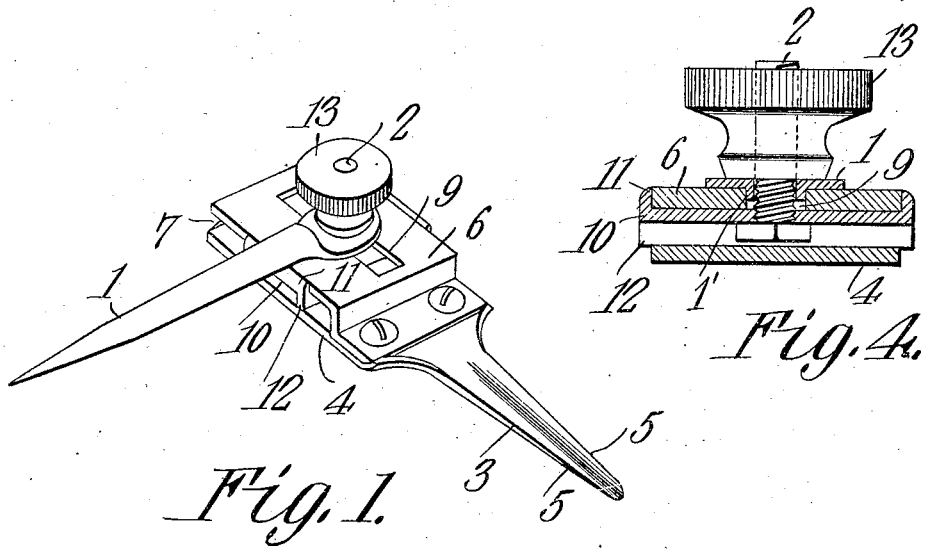
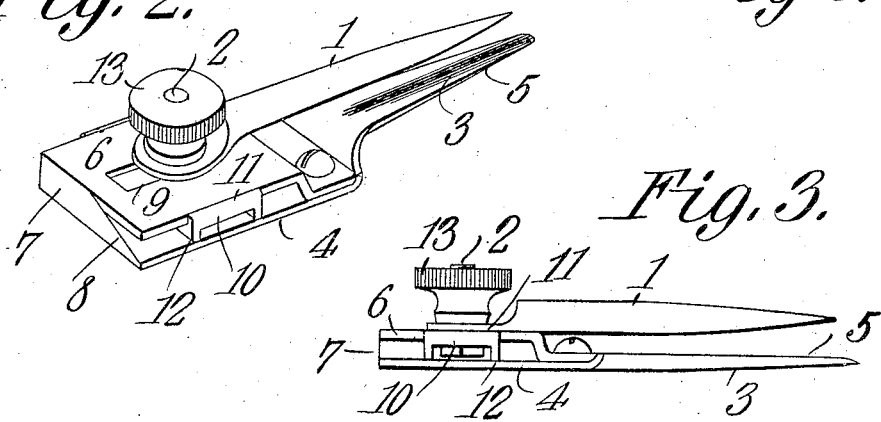
Charles J. Person,
INVENTOR.
WITNESSES:
By C. A. Snow & Co.
ATTORNEYS

UNITED STATES PATENT OFFICE.

CHARLES J. PERSON, OF ST. JOSEPH, MISSOURI.

BELT-LACER'S TOOL.

No. 852,614.  Specification of Letters Patent.  Patented May 7, 1907.

Application filed March 9, 1907. Serial No. 361,512.

*To all whom it may concern:*

Be it known that I, CHARLES J. PERSON, a citizen of the United States, residing at St. Joseph, in the county of Buchanan and State of Missouri, have invented a new and useful Belt-Lacer's Tool, of which the following is a specification.

This invention has relation to belt lacer's combination tools and it consists in the novel construction and arrangement of its parts as hereinafter shown and described.

The object of the invention is to provide a tool adapted to be used by belt lacers and which is provided with a member adapted to be used as a cutter for making the holes in the belt.

The tool is also provided with a member adapted to be used as an awl for spreading the holes and also with a knife for cutting belt lacing and means for regulating the breadth of such lacing.

In the accompanying drawing:—Figure 1 is a perspective view of the implement showing the cutter and the awl spread apart. Fig. 2 is a perspective view of the implement showing the awl in alinement with the cutter. Fig. 3 is an edge elevation of the implement. Fig. 4 is a transverse sectional view of the same, and Fig. 5 is a plan view of the under side of the blunt end of the awl.

The implement consists of the pointed awl 1 which is mounted upon the externally threaded pin 2. The said awl is provided upon the under side of its blunt end with a square stop-block 1' to bear upon the two edges of the perforation 9 to hold the awl secure in position as hereinafter explained. The cutter 3 is concaved transversely along its longitudinal axis and tapers from its shank 4 toward its end and is provided with cutting edges 5. The plate 6 is attached at one end to the shank 4 by means of two screws and its opposite end portion is spaced from the said shank. The knife 7 connects the end of the shank 4 and the plate 6 together. Said knife is provided with the relatively inclined cutting edge 8. The plate 6 is provided with the elongated perforation 9 which is disposed in alinement with the longitudinal axis of the said plate. The block 10 is provided with flanges 11 which receive the edges of the plate 6 and flanges 12 which bear upon the surface of the shank 4. The said block is located between the shank 4 and the plate 6 and is arranged to slide within the space between the last said members. The pin 2 is mounted upon the block 10 and the milled nut 13 is screw threaded upon the pin 2 and is adapted to bear upon the end of the awl 1 and clamp the parts together.

When the implement is not in use the parts are secured together in the positions as illustrated in Fig. 2 when the awl 1 is in alinement with the cutter 3 and consequently the implement takes up little room.

When the implement is used for making holes in a belt and for spreading of the same, the nut 13 is unscrewed and the awl 1 is swung around upon the pin 2 until it is substantially at right angles to the cutter 3 when the nut 13 is tightened up and the stop-block 1' on the awl engages the two edges of the perforation 9 and plate 6 and the parts are clamped together. The implement may then be readily and conveniently held in the hand with either the awl 1 or the cutter 3 lying between the fingers thereof during the operation of making a hole or spreading one after it has been made. When the holes are made a belt lace of any desired breadth may be cut from a strip of leather by adjusting the block 10 toward or away from the knife 7 and by passing the edge of the block 10 along the strip of leather so that the said knife will cut within the edge and separate the lace from the said strip.

Having described my invention what I claim as new and desire to secure by Letters-Patent is:—

1. A tool such as described comprising an awl having a stop-block to hold the awl secure in position, a cutter having cutting edges and being concaved along its longitudinal axis, a pin connected with the shank of said cutter and pivotally supporting the awl and a nut screw-threaded upon the pin and adapted to clamp the awl and the cutter together.

2. A tool such as described comprising a cutter, a knife located upon the shank of the cutter, a block adjustably mounted upon the shank of the cutter with relation to said knife and an awl pivotally mounted upon said block.

3. A tool such as described comprising a cutter, a plate attached to the shank thereof by means of two screws and having an elongated perforation, a knife connecting the end of said shank and said plate together, a block located between the shank and the plate, a pin carried by said block and passing through the perforation of the plate, an awl mounted upon said pin and a nut screw-threaded upon the pin.

4. A tool such as described comprising an awl, a cutter having cutting edges and being concaved along its longitudinal axis, a pin connected with the shank of said cutter and pivotally supporting the awl and a nut screw-threaded upon the pin and adapted to clamp the awl and the cutter together.

5. A tool such as described comprising a cutter, a knife located upon the shank of the cutter, a block adjustably mounted upon the shank of the cutter with relation to said knife and an awl pivotally mounted upon said block.

6. A tool such as described comprising a cutter, a plate attached to the shank thereof and having an elongated perforation, a knife connecting the end of said shank and said plate together, a block located between the shank and the plate, a pin carried by said block and passing through the perforation of the plate, an awl mounted upon said pin and a nut screw-threaded upon the pin.

In testimony that I claim the foregoing as my own, I have hereto affixed my signature in the presence of two witnesses:

CHARLES J. PERSON.

Witnesses:
S. MARKS,
F. E. FLEMING.